United States Patent [19]

Ishii

[11] Patent Number: 5,404,572
[45] Date of Patent: Apr. 4, 1995

[54] RADIO COMMUNICATION APPARATUS WHICH CAN BE TESTED BY RADIO AND OPTICAL TEST SIGNALS

[75] Inventor: Daisuke Ishii, Tokyo, Japan

[73] Assignee: NEC Corporation, Tokyo, Japan

[21] Appl. No.: 732,002

[22] Filed: Jul. 18, 1991

[30] Foreign Application Priority Data

Jul. 18, 1990 [JP] Japan .................................. 2-189819
Jul. 31, 1990 [JP] Japan .................................. 2-203662

[51] Int. Cl.⁶ ............................................. H04B 17/00
[52] U.S. Cl. .................... 455/67.4; 455/67.7; 455/103; 359/145
[58] Field of Search .............. 455/67.4, 67.7, 226.1, 455/226.4, 38.1, 38.2, 38.4, 59, 103, 228, 229, 277.1, 277.2; 359/145, 155; 324/527, 528, 531; 340/825.44

[56] References Cited

U.S. PATENT DOCUMENTS

| | | | |
|---|---|---|---|
| 3,112,486 | 11/1963 | Adler | 455/59 X |
| 4,332,032 | 5/1982 | Daniel | 455/277.2 |
| 4,442,502 | 4/1984 | Friend et al. | 359/145 X |
| 4,904,993 | 2/1990 | Sato | 359/145 X |
| 4,977,399 | 12/1990 | Price et al. | 455/67.4 X |
| 5,034,997 | 7/1991 | Iwasaki | 455/59 X |
| 5,054,112 | 10/1991 | Ike | 455/277.1 X |
| 5,070,536 | 12/1991 | Mahany et al. | 455/67.4 |

Primary Examiner—Edward F. Urban
Attorney, Agent, or Firm—Sughrue, Mion, Zinn, Macpeak & Seas

[57] ABSTRACT

A radio communication apparatus (21) is tested by not only a radio test signal but also an optical test signal. Each test signal carries a test digital data signal. The apparatus has a radio processing section (24, 25) for processing the radio test signal into the test digital data signal. A data processing section (28, 29) processes an input data signal into a processed data signal. Responsive to the processed data signal, an announcing section (30, 31) announces generation of the processed data signal. An optical processing section (32, 27) processes the optical test signal into the digital data signal. Connected to the radio and the optical processing sections and to the data processing section, a selector (26) selects, as the input data signal, one of the test digital data signals produced by the radio and the optical processing sections.

4 Claims, 6 Drawing Sheets

RADIO COMMUNICATION APPARATUS WHICH CAN BE TESTED BY RADIO AND OPTICAL TEST SIGNALS

BACKGROUND OF THE INVENTION

This invention relates to a radio communication apparatus for use in combination with a test transmitter for use in testing the radio communication apparatus. This invention relates also to the test transmitter for transmitting a radio test signal carrying a test digital data signal. The radio communication apparatus may be a radio paging receiver, a transceiver, or the like although description will be mainly made in connection with the radio paging receiver.

A test transmitter of the type described, generally comprises a signal producing section for producing the test digital data signal. Connected to the signal producing section, a radio test signal transmitting section transmits the radio test signal which carries the test digital data signal.

A radio paging receiver of the type described, generally comprises a radio processing section for processing the radio test signal into the test digital data signal. Supplied with the test digital data signal as an input digital data signal, a data processing section processes the input digital data signal into a processed data signal. Connected to the data processing section, an announcing section carries out an announcing operation of generation of the processed data signal in response to the processed data signal.

On testing the radio paging receiver, the test transmitter transmits to the radio paging receiver the radio test signal carrying the test digital data signal. When the radio paging receiver has not a faulty component, the announcing section announces generation of the processed data signal. When the radio paging receiver has a faulty component, the announcing section does not announce generation of the processed data signal. Thus, the radio paging receiver can be tested or judged as regards whether or not the radio paging receiver has a faulty component.

However, when it is judged that the radio paging receiver has the faulty component, it is difficult to specify whether the faulty component is the radio processing section or a remaining part comprising the data processing section and the announcing section.

SUMMARY OF THE INVENTION

It is therefore an object of this invention to provide a radio communication apparatus operable in combination with a test transmitter, wherein a faulty component can easily be specified.

It is another object of this invention to provide a radio communication apparatus of the type described, wherein it is easily judged whether the faulty component is a radio processing section or a remaining section.

It is a further object of this invention to provide a test transmitter for use in combination with a radio communication apparatus, which test transmitter makes it easy to specify a faulty component in the radio communication apparatus.

Other objects of this invention will become clear as the description proceeds.

On describing the gist of an aspect of this invention, it is possible to understand that a radio communication apparatus is for use in combination with a test transmitter for use in testing the radio communication apparatus. The test transmitter is for transmitting a radio test signal carrying a test digital data signal. The radio communication apparatus includes: radio processing means for processing the radio test signal into the test digital data signal; data processing means supplied with an input digital data signal for processing the input digital data signal into a processed data signal; and announcing means connected to the data processing means for carrying out an announcing operation of generation of the processed data signal in response to the processed data signal.

According to this aspect of this invention, the above-understood radio communication apparatus comprising: optical processing means supplied with an optical test signal carrying the test digital signal that is transmitted by the test transmitter, the optical processing means being for processing the optical test signal into the test digital data signal; and selecting means connected to the radio and the optical processing means and to the data processing means for selecting one of the test digital data signals produced by the radio and the optical processing means. The selecting means produces the above-mentioned one of the test digital data signals as the input digital data signal.

On describing the gist of a different aspect of this invention, it is possible to understand that a test transmitter is for use in testing a radio communication apparatus. The test transmitter includes: signal producing means for producing a test digital data signal; and radio test signal transmitting means for transmitting a radio test signal carrying the test digital data signal. The radio communication apparatus includes: radio processing means for processing the radio test signal into the test digital data signal; data processing means supplied with an input digital data signal for processing the input digital data signal into a processed data signal; and announcing means connected to the data processing means for carrying out an announcing operation of generation of the processed data signal in response to the processed data signal.

According to the different aspect of this invention, the above-understood test transmitter comprises: optical test signal transmitting means for transmitting an optical test signal carrying the test digital data signal; and selective supplying means connected to the signal producing means and to the radio and the optical test signal transmitting means for selectively supplying the test digital data signal to one of the radio and the optical test signal transmitting means. The radio communication apparatus comprises: optical processing means for processing the optical test signal into the test digital data signal; and selecting means connected to the radio and the optical processing means and to the data processing means for selecting one of the test digital data signals produced by the radio and the optical processing means. The selecting means produces, as the input digital data signal, the above-mentioned one of the test digital data signals produced by the radio and the optical processing means.

DESCRIPTION OF THE PREFERRED EMBODIMENTS

Figure 1:
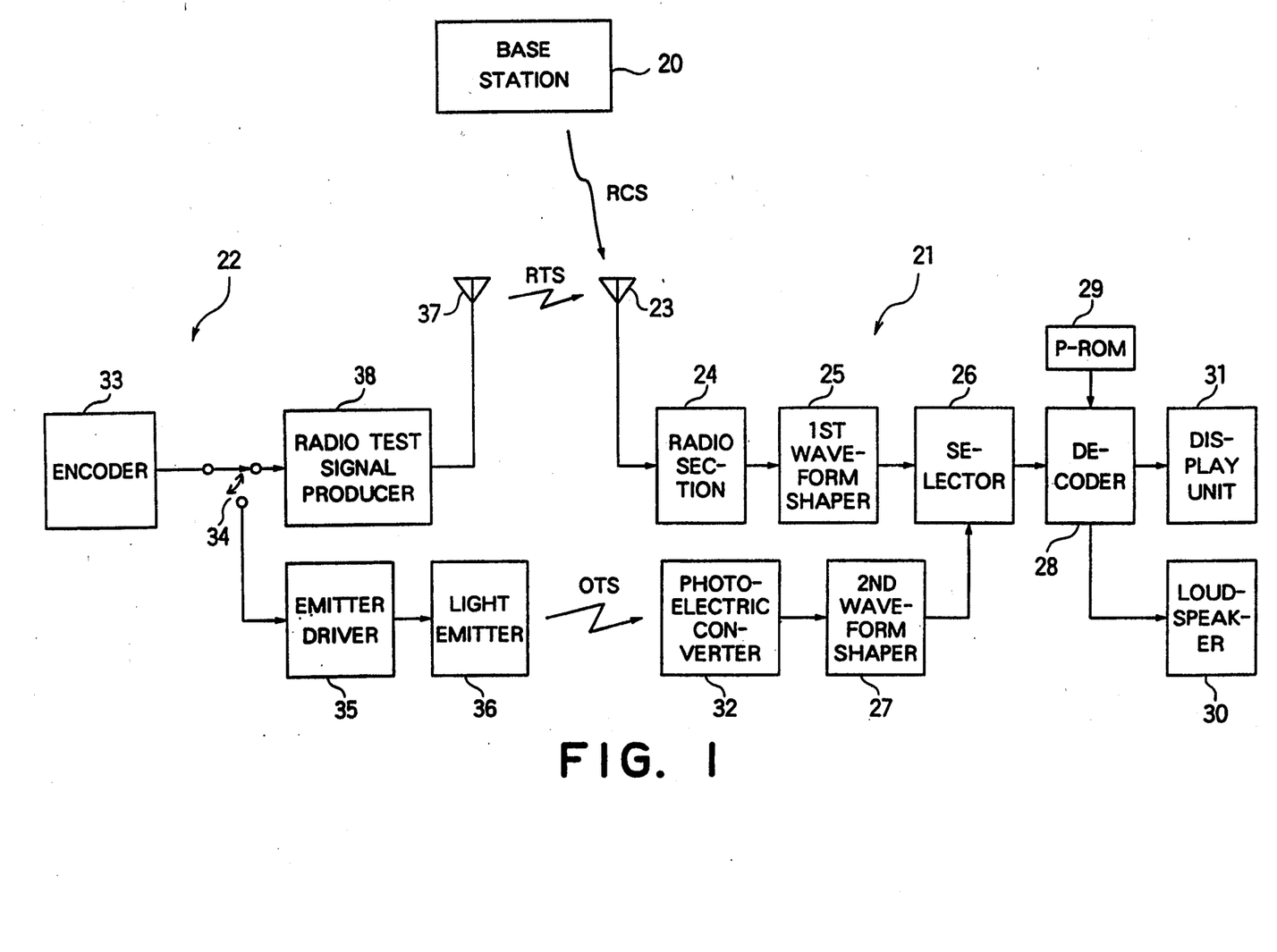
FIG. 1 is a block diagram of a combination of a radio paging receiver according to a first embodiment of this invention, a test transmitter, and a base station.

Referring to FIG. 1, a radio paging system comprises a base station 20, a radio paging receiver 21 according to a first embodiment of this invention, and other radio paging receivers (not shown) which are similar in structure and in operation to the radio paging receiver 21. The base station 20 is for transmitting a radio communication signal indicated at RCS. The radio paging receiver 21 deals with the radio communication signal RCS in the manner which will become clear as the description proceeds.

The radio paging receiver 21 is for use in combination with a test transmitter 22 which is for use in testing the radio paging receiver 21. The test transmitter 22 is usually carried by a maintenance engineer who is in charge of maintenance service of the radio paging system. The test transmitter 22 is for transmitting a radio test signal indicated at RTS.

Figures 2A, 2B:
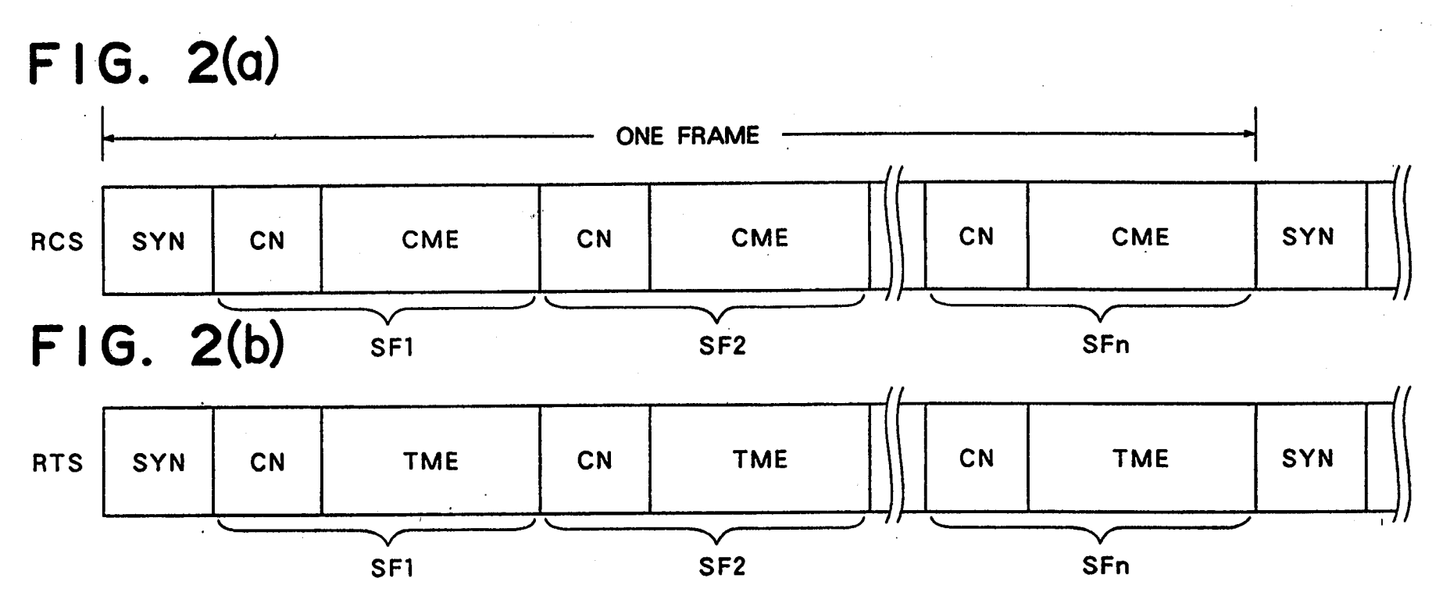
FIG. 2 is a signal format for use in describing operation of the radio paging receiver illustrated in FIG. 1.

Turning to FIG. 2, the radio communication signal RCS is illustrated along a top or first line. The illustrated radio communication signal RCS is a POGSAG code radio signal which is set up in CCIR recommendation 584. The radio communication signal RCS comprises a plurality of frames which are similar in frame structures to one another.

Each frame of the radio communication signal RCS carries a synchronization signal SYN and first through n-th subframes SF1 to SFn successively succeeding the synchronization signal SYN, where n represents an integer greater than one. The synchronization signal SYN has a predetermined number of bits and is specified by a predetermined pattern of bits.

The radio paging receiver 21 (FIG. 1) and other radio paging receivers of the radio paging system have call numbers different from one another and may be grouped into first through n-th groups. The first through the n-th groups are assigned to the first through the n-th subframes SF1 to SFn of each frame, respectively. Supposing that the radio paging receiver 21 belongs to the first group, the base station 20 (FIG. 1) transmits a call number signal CN representative of the radio paging receiver 21 and a communication message signal CME representative of a communication message directed to the radio paging receiver 21 by using the first subframe SF1. The call number signal CN has a preselected number of bits. The communication message signal CME has another preselected number of bits. Each of the synchronization signal SYN, the call number signal CN, and the communication message signal CME consists of Bose-Chaudhuri-Hocquenghem (BCH) codes.

A combination of the synchronization signal SYN, the call number signal CN, and the communication message signal CME will be referred to herein as a communication digital data signal. The communication digital data signal is carried by the radio communication signal RCS.

In FIG. 2, the radio test signal RTS is illustrated along a second line. The radio test signal RTS is similar in frame structure to the radio communication signal RCS except that the call number signal CN representative of the radio paging receiver 21 and a test message signal TME representative of a test message are transmitted by using the first through the n-th subframes SF1 to SFn in order to test the radio paging receiver 21. Alternatively, the call number signal CN and the test message signal TME may be transmitted by using only the first subframe SF1.

A combination of the synchronization signal SYN, the call number signal CN, and the test message signal TME is referred to herein as a test digital data signal. The test digital data signal is carried by the radio test signal RTS.

Turning back to FIG. 1 with reference to FIG. 2 continued, description will be made as regards operation of the radio paging receiver 21 when the radio paging receiver 21 is tested by the test transmitter 22. In this event, the maintenance engineer makes the test transmitter 22 transmit the radio test signal RTS at first.

The radio test signal RTS is picked up by an antenna 23 and supplied to a radio section 24. The radio section 24 converts or demodulates the radio test signal RTS into a baseband or demodulated signal. Connected to the radio section 24, a first waveform shaper 25 shapes the demodulated signal into a shaped signal of a digital waveform. The shaped signal has the test digital data signal (namely, a combination of the synchronization signal SYN, the call number signal CN, and the test message signal TME).

Thus, a combination of the antenna 23, the radio section 24, and the first waveform shaper 25 serves as a radio processing section for processing the radio test signal RTS into the test digital data signal.

A selector 26 is connected to the first waveform shaper 25 and a second waveform shaper 27 which will later be described. In the manner which will become clear as the description proceeds, the selector 26 is made by the maintenance engineer so as to select, as a selected signal, the test digital data signal produced by the first waveform shaper 25.

Supplied with the selected signal as an input digital data signal, the decoder 28 detects the synchronization signal SYN in order to establish bit synchronization and frame synchronization. After the bit synchronization and the frame synchronization are established, the decoder 28 cooperates with a P-ROM (programmable read-only memory) 29 which preliminarily memorizes a directory number signal indicative of a directory number assigned to the radio paging receiver 21. That is, the decoder 28 compares the call number signal CN with the directory number signal bit by bit.

When the decoder 28 detects coincidence between bits of the call number signal CN and the directory number signal, the decoder 28 sends a speaker drive signal to a loudspeaker 30 to make the loudspeaker 30 generate a call tone indicative of a call to the radio paging receiver 21 a predetermined time duration. Simultaneously, the decoder 28 sends the test message signal TME to a display unit 31 to make the display unit 31 visually display the test message of the test message signal TME. The display unit 31 is, for example, a liquid crystal display (LCD).

Thus, the decoder 28 serves, in cooperation with the P-ROM 29, as a data processing section supplied with the input digital data signal. The data processing section processes the input digital data signal into a processed data signal (namely, the speaker drive signal and the test message signal TME). A combination of the loudspeaker 30 and a display unit 31 serves as an announcing section connected to the data processing section. The announcing section carries out an announcing operation of generation of the processed data signal in response to the processed data signal.

When the radio paging receiver 21 carries out generation of the call tone and display of the test message while the test transmitter 22 transmits the radio test signal RTS, the maintenance engineer judges that the radio paging receiver 21 has not a faulty component.

When the radio paging receiver 21 carries out neither generation of the call tone nor display of the test message in spite of transmission of the radio test signal RTS from the test transmitter 22, the maintenance engineer judges that the radio paging receiver 21 has a faulty component. In this case, the maintenance engineer makes the test transmitter 22 transmit an optical test signal OTS instead of the radio test signal RTS in order to judge whether the faulty component is the radio processing section or a remaining part comprising the data processing and the announcing sections.

The optical test signal CTS carries the test digital data signal like the radio test signal RTS. More specifically, the optical test signal OTS is controlled or modulated by the test digital data signal to form a flicker light which indicates logic "1" and "0" levels of the test digital data signal.

A photoelectric converter 32 converts the optical test signal OTS into a converted or demodulated signal. Connected to the photoelectric converter 32, the second waveform shaper 27 shapes the converted signal into a shaped signal of a digital waveform that is equivalent to the test digital data signal (namely, a combination of the synchronization signal SYN, the call number signal CN, and the test message signal TME).

Thus, a combination of the photoelectric converter 32 and the second waveform shaper 27 is operable as an optical processing section which processes the optical test signal OTS into the test digital data signal.

In the manner which will become clear as the description proceeds, the selector 26 is now made by the maintenance engineer so as to select, as the selected signal, the test digital data signal produced by second waveform shaper 27. As described above, the decoder 28 is supplied with the selected signal as the test digital data signal.

Thus, the selector 26 is connected to the radio and the optical processing section and to the data processing section (namely, a combination of the decoder 28 and the P-ROM 29) to select one of the test digital data signals produced by the radio and the optical processing sections. The selector 26 produces the above-mentioned one of the test digital data signals as the input digital data signal of the data processing section.

When the radio paging receiver 21 carries out generation of the call tone and display of the test message while the test transmitter 22 transmits the optical test signal OTS, the maintenance engineer judges that the faulty component is the radio processing section.

When the radio paging receiver 21 carries out neither generation of the call tone nor display of the test message in spite of transmission of the optical test signal OTS from the test transmitter 22, the maintenance engineer confirms, by the use of a measuring instrument of, for example, a voltmeter or an oscilloscope, whether or not the test digital data signal is present in a first connection point between the second waveform shaper 27 and the selector 26. Subsequently, the maintenance engineer confirms, by the use of the measuring instrument, whether or not the test digital data signal is present in a second connection point between the selector 26 and the decoder 28. When the maintenance engineer confirms that the test digital data signal is present in the first connection point and that the test digital data signal is present in the second connection point, the maintenance engineer judges that the faulty component is the remaining part (namely, a combination of the data processing section and the announcing section).

When the radio paging receiver 21 has not a faulty component, the radio paging receiver 21 is operable in response to the radio communication signal RCS in the manner similar to a case where the radio paging receiver 21 receives the radio test signal RTS. In this event, the loudspeaker 30 generates the call tone when the radio paging receiver 21 receives the call number signal CN representative of the call number assigned to the radio paging receiver 21. The display unit 31 displays the communication message of the communication message signal CME when the radio paging receiver 21 receives the communication message signal CME which succeeds the call number signal CN representative of the call number assigned to the radio paging receiver 21.

Attention will proceed to the test transmitter 22. The test transmitter has an encoder 33 which serves as a signal producing section for producing the test digital data signal having logic "1" and "0" levels. A transmitter switch 34 selectively supplies the test digital data signal to one of a radio test signal producer 38 and an emitter driver 35 for driving a light emitter 36 which is, for example, an LED (light-emitting diode), a laser diode, or the like.

When supplied with the test digital data signal through the transmitter switch 34, the radio test signal producer 34 produces the radio test signal RTS carrying the test digital data signal. The radio test signal RTS is transmitted through an antenna 37.

Thus, a combination of the radio test signal producer 34 and the antenna 37 is operable as a radio test signal transmitting section which transmits the radio test signal RTS carrying the test digital data signal.

When supplied with the test digital data signal, the emitter driver 35 produces an on-off drive signal which indicates on and off when the test digital data signal has logic "1" and "0" levels, respectively. Responsive to the on-off drive signal, the light emitter 36 emits or transmits the flicker light as the optical test signal OTS carrying the test digital data signal.

Thus, a combination of the emitter driver 35 and the light emitter 36 serves as an optical test signal transmitting section which transmits the optical test signal OTS carrying the test digital data signal. The transmitter switch 34 serves as a selective supplying section connected to the signal producing section (namely, encoder 33) and to the radio and the optical test signal transmitting sections. The selective supplying section selectively supplies the test digital data signal to one of the radio and the optical test signal transmitting sections.

Figure 3:
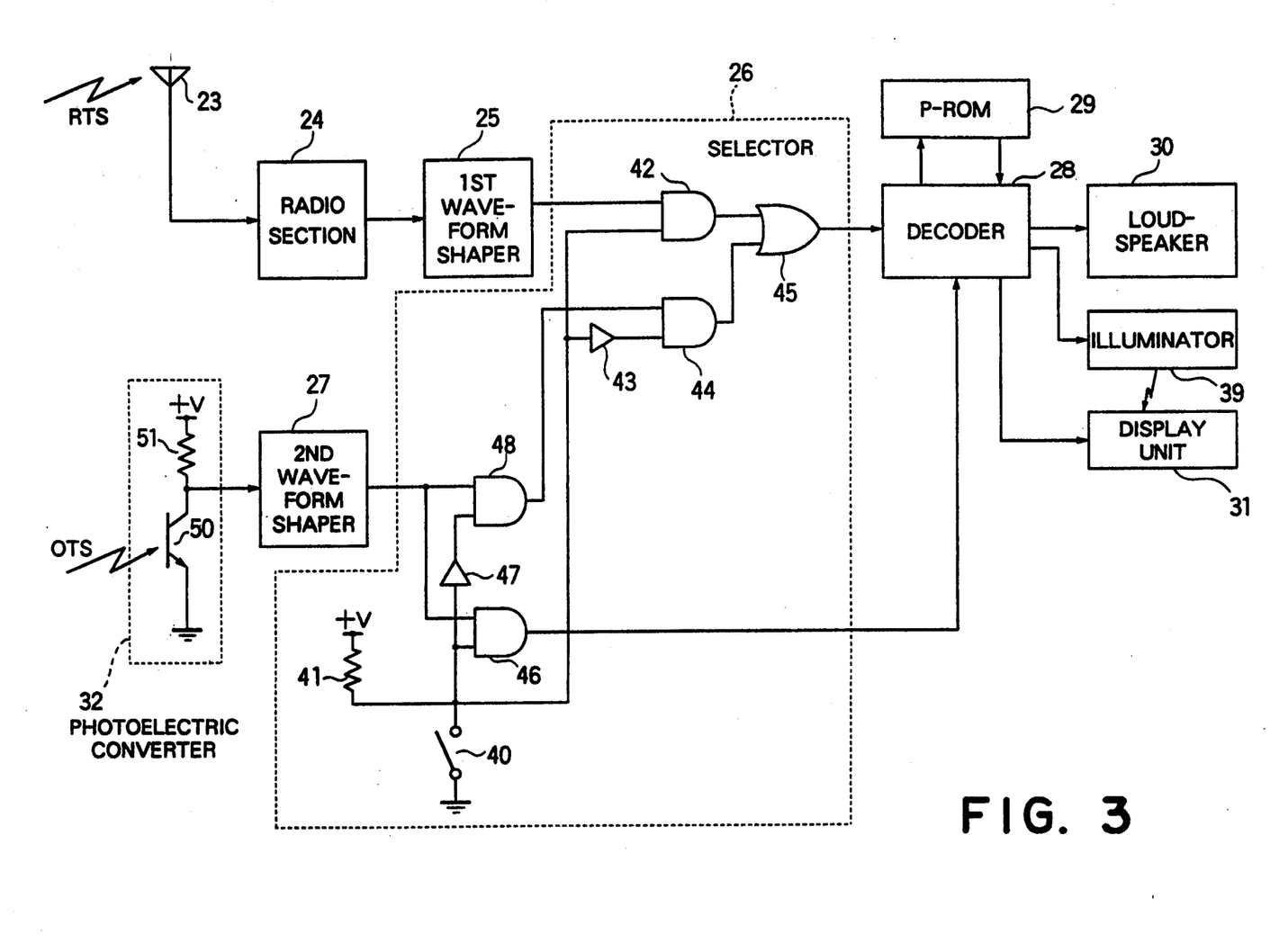
FIG. 3 is a block diagram of a radio paging receiver according to a second embodiment of this invention.

Turning to FIG. 3, a radio paging receiver according to a second embodiment of this invention comprises similar parts designated by like reference numerals. The radio paging receiver comprises an illuminator 39, such as a lamp, connected to the decoder 28. The illuminator 39 illuminates the display unit 31 by illuminating light when the illuminator 39 is driven by the decoder 28.

The selector 26 comprises a switch 40 having negative and positive terminals connected to the earth or ground directly and a voltage source through a resistor 41, respectively. The voltage source is indicated at +V and gives a positive voltage to the positive terminal. The negative terminal is supplied with an earth voltage. It will be assumed that the positive and the earth voltages corresponding to a logic "1" level and a logic "0" level.

The switch 40 is usually put in an off state. That is, the switch 40 is put in the off state when the radio test signal RTS is transmitted by the test transmitter 22 (FIG. 1). The switch 40 is put in an on state by the maintenance engineer when the optical test signal OTS is transmitted by the test transmitter 22.

Description will be made as regards operation of the selector 26 when the switch 40 is put into the off state. In this case, a first AND circuit 42 is supplied with the logic "1" level through the resistor 41. Inasmuch as an inverter 43 is supplied with the logic "1" level through the resistor 41 and inverts the logic "1" level into the logic "0" level, a second AND circuit is supplied with the logic "0" level. The first AND circuit 42 thereby delivers to an OR circuit 45 the test digital data signal produced by the first waveform shaper 25. The OR circuit 45 delivers to the decoder 28 the test digital data signal produced by the first waveform shaper 25.

A third AND circuit 46 is supplied with the logic "1" level through the resistor 41. Inasmuch as an inverter 47 is supplied with the logic "1" level through the resistor 41 and inverts the logic "1" level into the logic "0" level, a fourth AND circuit 48 is supplied with the logic "0" level. The third AND circuit 46 thereby delivers to the decoder 28 an output signal of the second waveform shaper 27.

Attention will be directed to the photoelectric converter 32. The photoelectric converter 32 comprises a phototransistor 50 having a collector and an emitter connected to the earth or ground. The collector is connected to the voltage source +V through a resistor 51.

The phototransistor 50 is supplied with environment light of the radio paging receiver when the test transmitter 22 does not transmit the optical test signal OTS but transmits the radio test signal RTS. When the environment light has a high intensity or brightness, a collector voltage of the collector of the phototransistor 50 becomes nearly equal to an earth voltage. When the environment light has a low intensity or brightness, the collector voltage becomes nearly equal to the positive voltage of the voltage source +V. Thus, the collector voltage varies in compliance with an intensity of the environment light. The photoelectric converter 32 supplies the collector voltage to the second waveform shaper 27 as the converted signal.

The second waveform shaper 27 shapes the converted signal into a shaped signal of a digital form. The shaped signal has a logic "1" level when the environment light has a low intensity. When the environment light has a high intensity, the shaped signal has a logic "0" level. That is, when environment of the radio paging receiver becomes dark, the shaped signal has the logic "1" level.

In the manner described above, the third AND circuit 46 of the selector 26 delivers the shaped signal (namely, the output signal of the second waveform shaper 27) to the decoder 28 when the switch 40 is put in the off state. On condition that the decoder 28 receives the shaped signal of the logic "1" level when the decoder 28 drives the display unit 31 so as to make the display unit 31 display the test message, the decoder 28 drives the illuminator 39 to make the illuminator 39 illuminate the display unit 31 by the illuminating light.

Description will proceed to operation of the selector 26 when the switch 40 is put in the on state. As mentioned above, the switch 40 is put in the on state when the optical test signal OTS carrying the test digital data signal is transmitted by the test transmitter 22. In this case, the phototransistor 50 is supplied with the optical test signal OTS rather than the environment light and processes the optical test signal OTS into the converted or demodulated signal in the manner similar to a case where the phototransistor 50 is supplied with the environment light. The second waveform shaper 27 shapes the converted signal into the test digital data signal.

When the switch 40 is put in the on state, the earth voltage (namely, the logic "0" level) is supplied to the inverters 47 and 43 through the switch 40. Inasmuch as the inverters 47 and 43 supply the fourth and the second AND circuits 48 and 44 with the logic "1" level, the test digital data signal is delivered to the decoder 28 as the input digital data signal through the fourth and the second AND circuits 48 and 44 and the OR circuit 45. Inasmuch as the earth voltage (namely, the logic "0" level) is supplied to the third and the first AND circuits 46 and 42, output signals of the second and the first waveform shapers 27 and 25 are not delivered through the third and the first AND circuits 46 and 42 to the decoder 28.

Figure 4:
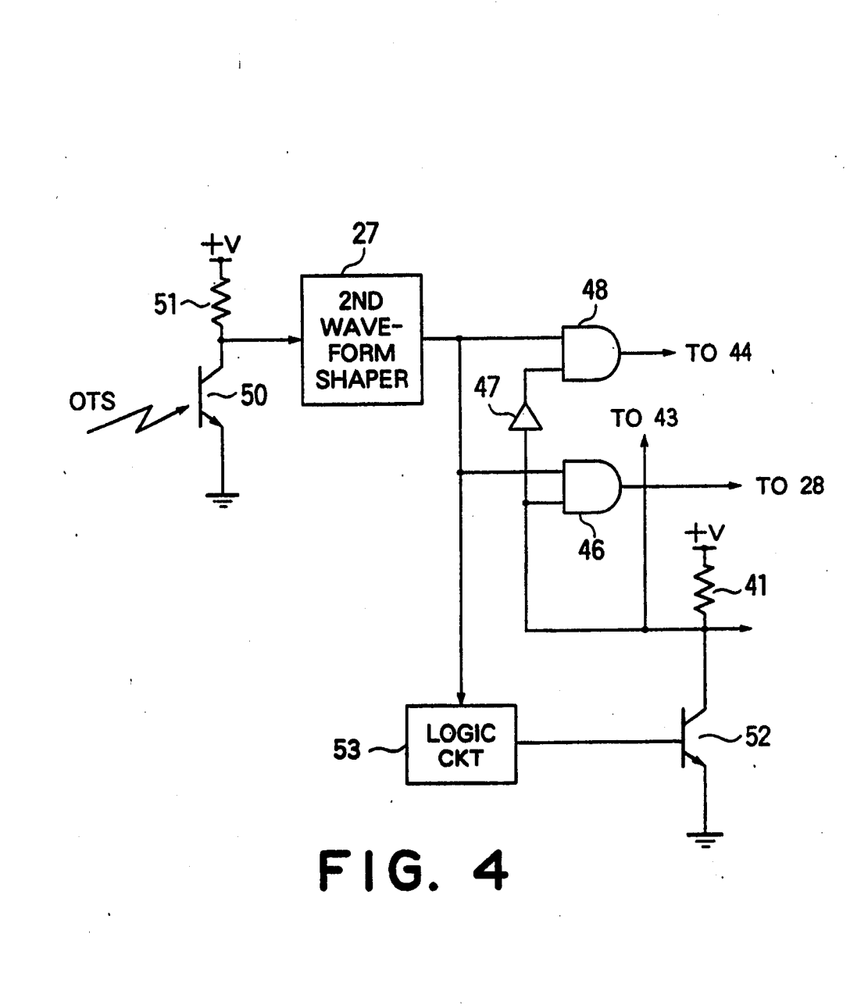
FIG. 4 is a block diagram of a part of a modified example of the radio paging receiver illustrated in FIG. 3.

Turning to FIG. 4, a transistor switch 52 may be used instead of the switch 40 illustrated in FIG. 3. The transistor switch 52 has a base electrode, a collector electrode, and an emitter electrode connected to the earth. The collector electrode is connected to the resistor 41, the inverters 43 and 47, and the third AND circuit 46 like the positive terminal of the switch 40.

In order to put the transistor switch 52 in one of off and on states a logic circuit 53 is connected to the base electrode of the transistor switch 52. The logic circuit 53 is also connected to an output of the second waveform shaper 27. When the maintenance engineer wishes to put the transistor switch 52 in the off state, the maintenance engineer makes an optical signal generator (not shown) generate a first optical signal towards the phototransistor 50 under a dark environment in which the environment light of the radio paging receiver is cut off. The first optical signal carries an off signal having a first predetermined pattern. When the maintenance engineer wishes to put the transistor switch 52 in the on state, the maintenance engineer makes the optical signal generator generate a second optical signal under the dark environment. The second optical signal carries an on signal having a second predetermined pattern that is different from the first predetermined pattern. The first and the second optical signals may be transmitted by the test transmitter 22 (FIG. 1).

Figure 5:
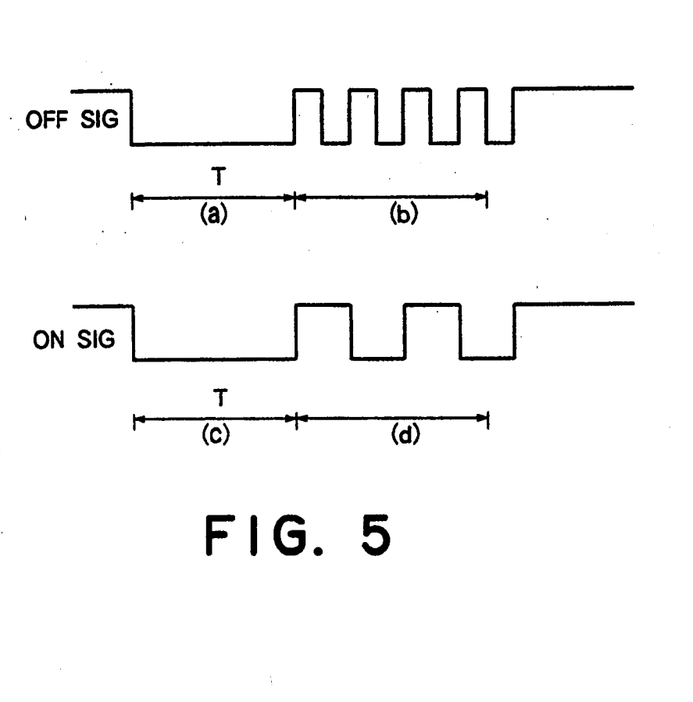
FIG. 5 is a flow chart for describing operation of the modified example illustrated in FIG. 4.

Turning to FIG. 5, the first optical signal is illustrated at OFF SIG along a first or top line. The first optical signal has a first part which is shown at (a) and which is a dark part continuing for T seconds. A second part succeeds the first part (a) and is shown at (b). Bright and dark parts alternately appears at a first period in the second part (b).

The second optical signal is illustrated at ON SIG along a second line. The second optical signal has a preceding part which is shown at (c) and is substantially equivalent to the first part (a) of the first optical signal. A succeeding part succeeds the preceding part (c) and is shown at (d). Bright and dark parts alternately appears in the succeeding part (d) at a second period which is different from the first period.

Turning back to FIG. 4, a combination of the phototransistor 50, the resistor 51, and the second waveform shaper 27 processes the first and the second optical signals into the off and the on signals of electric waveform when the phototransistor 50 is supplied with the first optical signal and when the phototransistor 50 is supplied with the second optical signal, respectively.

When the logic circuit 53 receives the off signal, the logic circuit 53 continuously produces the logic "0" or low level (namely, the earth voltage) until the logic circuit 53 receives the on signal. Supplied with the low level, the transistor switch 52 is put in the off state. When the logic circuit 53 receives the on signal, the logic circuit 53 continuously produces the logic "1" or high level until the logic circuit 53 receives the off signal.

Figure 6:
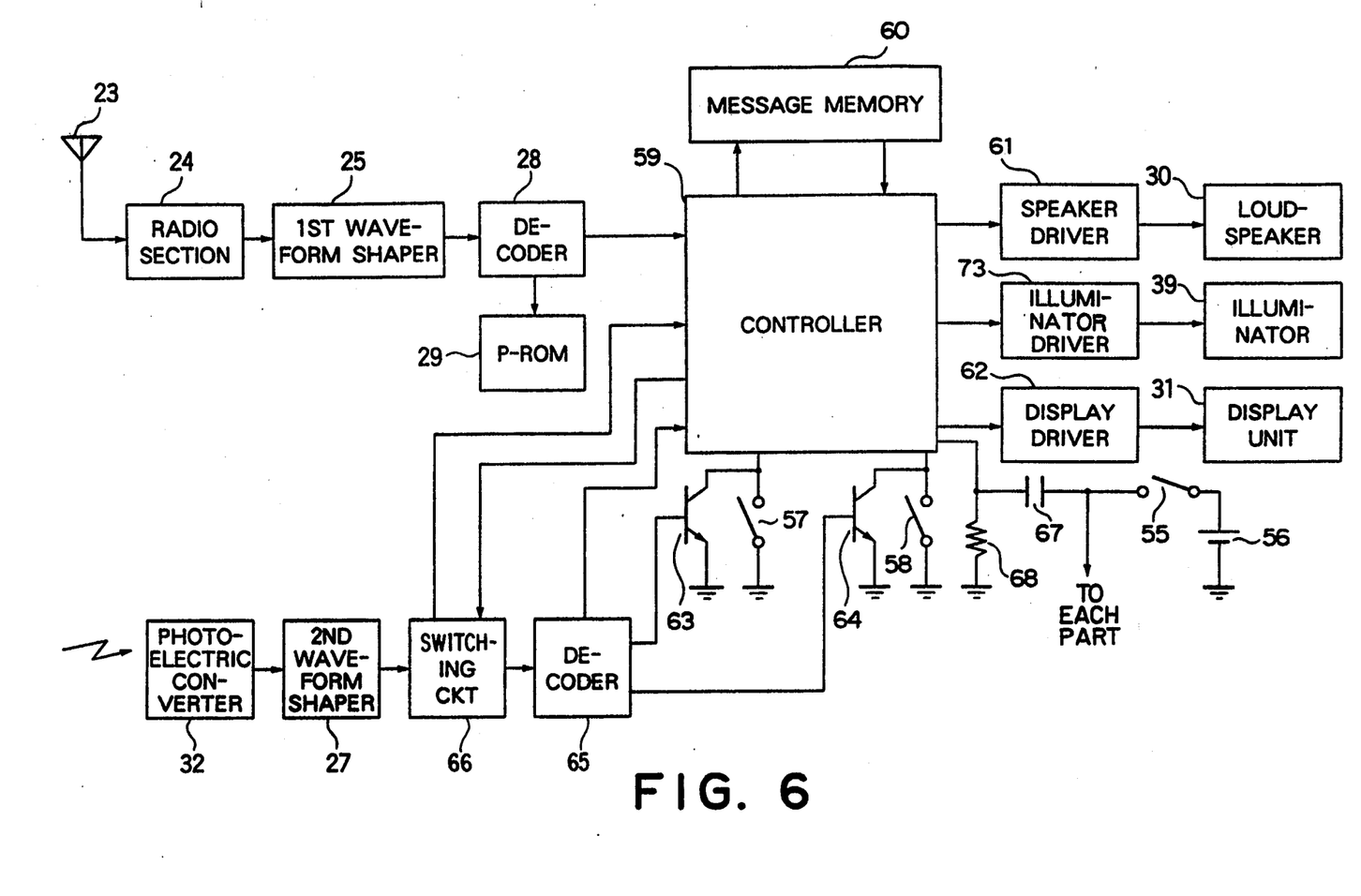
FIG. 6 is a block diagram of a radio paging receiver according to a third embodiment of this invention.

Turning to FIG. 6, a radio paging receiver according to a third embodiment of this invention comprises similar parts designated by like reference numerals. The radio paging receiver comprises a power source switch 55 having an on state and an off state. The power source switch 55 is connected to a battery 56 which serves as a power source. When the power source switch 55 is put in the on state, each part of the radio paging receiver is supplied with an electric power from the battery 56.

Description will be made on the supposition that the power source switch 55 is put in the on state and that each part of the radio paging receiver is supplied with the electric power. It will further be supposed that the radio paging receiver receives the radio test signal RTS (FIG. 2). In this case, the decoder 28 detects coincidence between bits of the call number signal CN of the test digital data signal and the directory number signal. When the decoder 28 detects the coincidence, the decoder 28 produces a coincidence signal representative of the coincidence. Subsequently, the decoder 28 produces the test message signal TME which succeeds the call number signal CN of the test digital data signal.

A first switch 57 is manually operable and has an on state and an off state. The first switch 57 is connected to the earth or ground which will be referred to as a reference voltage source.

A second switch 58 is manually operable and has an on state and an off state. The second switch 58 is connected to the earth.

A controller 59 is connected to the decoder 28, the first and the second switches 57 and 58, and a message memory 60 which may be an RAM (random access memory). In a case where the controller 59 receives the coincidence signal when the first switch 57 is put in the off state, the controller 59 sends a speaker drive signal to the loudspeaker 30 through a speaker driver 61 to make the loudspeaker 30 generate the call tone. In another case where the controller 59 receives the coincidence signal when the first switch 57 is put in the on state, the controller 59 does not send the speaker drive signal to the loudspeaker 30 to inhibit generation of the call tone.

Responsive to the coincidence signal, the controller 59 stores in the message memory 60 the test message signal TME succeeding the call number signal CN. In a case where the controller 59 receives the test message signal TME when the second switch 58 is put in the off state, the controller 59 sends the test message signal TME to the display unit 31 through a display driver 62 to make the display unit 31 display the test message. In another case where the controller 59 receives the test message signal TME when the second switch 58 is put in the on state, the controller 59 does not send the test message signal TME to the display unit 31 to inhibit display of the test message.

Thus, a combination of the controller 59, the message memory 60, the speaker driver 61, and the display driver 62 serves as a controlling section connected to the data processing section (namely, a combination of the decoder 28 and the P-ROM 29) and to the first and the second switches 57 and 58. The controlling section controls the announcing section (namely, a combination of the loudspeaker 30 and the display unit 31) to permit the announcing operation when the first switch 57 (or the second switch 58) is put in the off state. When the first switch 57 (or the second switch 58) is put in the on state, the controlling section controls the announcing section to inhibit the announcing operation.

A first transistor switch 63 has a base electrode (namely, a control terminal) and on and off states and connected to the first switch 57 in parallel. The first transistor switch 63 is controllably put in the on state when the base electrode is supplied with a predetermined control voltage. The predetermined control voltage is substantially equivalent to a logic "1" level.

A second transistor switch 64 is connected to the second switch 58 in parallel and is similar in structure and in operation to the first transistor switch 63. Each of the first and the second transistor switches 63 and 64 will be referred to as an electrically controllable switch.

The optical processing section (namely, a combination of the photoelectric converter 32 and the second waveform shaper 27) is supplied with an optical control signal carrying a digital control signal that is transmitted by the test transmitter 22 (FIG. 2). The optical processing section processes the optical control signal into the digital control signal.

A decoder 65 is connected to the second waveform shaper 27 through a switching circuit 66 which will later be described. In the manner which will become clear as the description proceeds, the switching circuit 66 supplies the digital control signal to the decoder 65. The decoder 65 decodes the digital control signal into a decoded signal of the logic "1" level and supplies the decoded signal to the control terminal of at least one of the first and the second transistor switches 63 and 64. The above-mentioned at least one of the first and the second transistor switches 63 and 64 is determined by the digital control signal.

Thus, the decoder 65 serves as a control signal processing section connected to the optical processing section and to the control terminal. The control signal processing section processes the digital control signal into the predetermined voltage (namely, a logic "1" level) and supplies the control terminal with the predetermined voltage.

Figure 7:
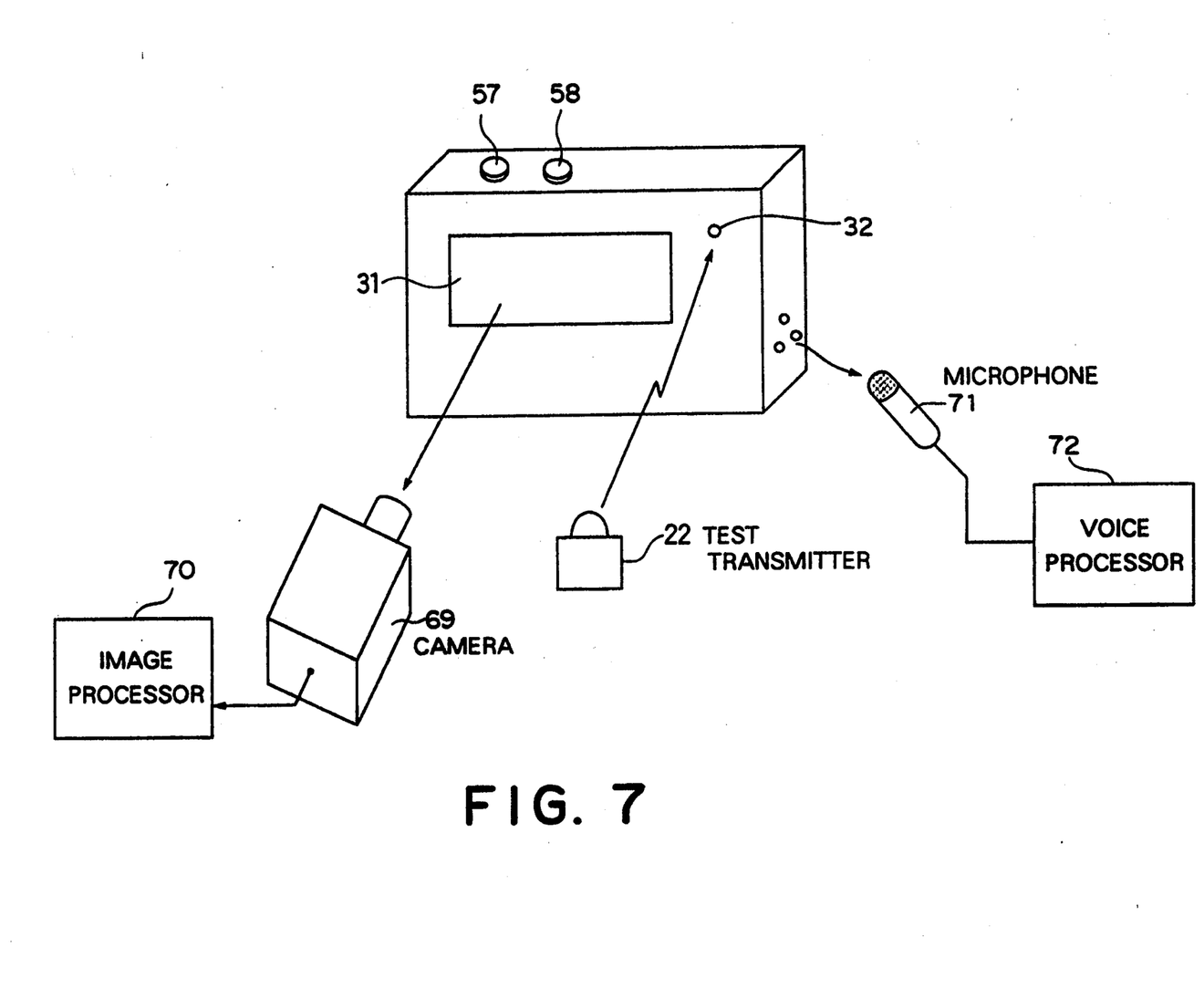
FIG. 7 is a view for use in describing a test method for testing the radio paging receiver illustrated in FIG. 6.

Referring to FIGS. 6 and 7, description will proceed to a test method for testing the radio paging receiver illustrated in FIG. 6. On testing the radio paging receiver, the maintenance engineer puts the power source switch 55 in the on state. When the power source switch 55 is put in the on state, each part of the radio paging receiver is supplied with the electric power from the battery 56. When the power source switch 55 is put in the on state, a trigger signal is produced by a differentiating circuit having capacitor 67 and a resistor 68. Responsive to the trigger signal, the controller 59 continuously supplies a switching instruction signal to the switching circuit 66. Supplied with the switching instruction signal, the switching circuit 66 connects an output of the second waveform shaper 27 to an input of the decoder 65 and maintains this connecting state while the switching instruction signal is received.

When the maintenance engineer makes the test transmitter 22 transmits an optical start signal carrying a digital test start signal. The optical processing section (namely, photoelectric converter 32 and second waveform shaper 27) processes the optical start signal into the digital test start signal. When the decoder 65 receives the digital test start signal through the switching circuit 66, the decoder 65 decodes the digital test start signal into a test start signal and delivers the test start signal to the controller 59. When the controller 59 receives the test start signal within a predetermined time interval after the controller 59 receives the trigger signal, the controller 59 continuously supplies the switching instruction signal until the controller 59 receives a test end signal. The test end signal is produced by the decoder 65 when the decoder 65 decodes a digital test end signal. The digital test end signal is carried by an optical end signal transmitted by the test transmitter.

When the controller 59 does not receive the test start signal within the predetermined time interval, the controller 59 stops supply of the switching instruction signal. The switching circuit 66 connects the output of the second waveform shaper 27 to an input of the controller 59 when the switching circuit 66 is not supplied with the switching instruction signal.

While the switching circuit 66 connects the output of the second waveform shaper 27 to the input of the decoder 65, the maintenance engineer makes another test transmitter (not shown) transmit the radio test signal RTS carrying the test digital data signal. Subsequently, the maintenance engineer makes the test transmitter 22 transmit the optical control signal carrying the digital control signal.

In FIG. 7, a television camera 69 serves as an image pickup device for picking up a displayed image of the display unit 31 to produce an image signal representative of the displayed image. An image processor 70 is connected to the television camera 69 for processing the image signal. A microphone 71 is for converting the call tone into an electric (voice) signal. Connected to the microphone 71, a voice processor 72 processes the voice signal.

Turning back to FIG. 6, when the switching circuit 66 connects the output of the second waveform shaper 27 to the input of the controller 59, the photoelectric converter 32 converts the environment light into an electric signal. The second waveform shaper 27 shapes the electric signal into a shaped signal of a digital form. The shaped signal is delivered to the controller 59 through the switching circuit 66. The controller 59 drives the illuminator 39 through an illuminator driver 73 like the decoder 28 of FIG. 3.

While this invention has thus far been described in conjunction with a few embodiments thereof, it will readily be possible for those skilled in the art to put this invention into practice in various other manners. In FIG. 6, the controller 59 may send the speaker drive signal to the loudspeaker 30 when the controller 59 receives the coincidence signal with the first switch 57 put in the on state. In FIG. 6, a microphone may be used instead of the photoelectric converter 32. In this case, the test transmitter transmits a voice signal of a predetermined frequency instead of the optical control signal in order to put the transmitter switch 63 in the off state.

What is claimed is:

1. A radio communication apparatus for use in combination with a test transmitter which is for use in testing said radio communication apparatus by transmitting a radio test signal carrying a test digital data signal, said radio communication apparatus comprising: radio processing means for processing said radio test signal into said test digital signal; data processing means supplied with an input digital data signal for processing said input digital data signal into a processed data signal; and announcing means connected to said data processing means for carrying out an announcing operation of generation of said processed data signal in response to said processed data signal; wherein said radio communication apparatus further comprises:

optical processing means supplied with an optical test signal which carries said test digital data signal and which is transmitted by said test transmitter after said radio test signal is transmitted, said optical processing means processing said optical test signal into said test digital data signal; and selecting means connected to said radio and said optical processing means and to said data processing means for selecting, as a selected signal, the test digital data signal produced by said radio processing means while said test transmitter transmits said radio test signal and for selecting, as said selected signal, the test digital data signal produced by said optical processing means while said test transmitter transmits said optical test signal, said selecting means producing said selected signal as said input digital data signal;

said announcing means carrying out said announcing operation, while said test transmitter transmits said radio test signal, when said radio communication apparatus does not contain a faulty component, said announcing means carrying out no announcing operation, while said radio transmitter transmits said radio test signal, when said radio communication apparatus contains said faulty component, said announcing means carrying out said announcing operation, while said test transmitter transmits said optical test signal, when said faulty component is said radio processing means, said announcing means carrying out no announcing operation, while said test transmitter transmits said optical test signal, when said faulty component is a remaining part comprising said data processing means and said announcing means.

2. A combination of a radio communication apparatus and a test transmitter for use in testing said radio communication apparatus, said test transmitter comprising: radio test signal transmitting means for transmitting a radio test signal carrying a test digital data signal; said radio communication apparatus comprising: radio processing means for processing said radio test signal into said test digital data signal; data processing means supplied with an input digital data signal for processing said input digital data signal into a processed data signal; and announcing means connected to said data processing means for carrying out an announcing operation of generation of said processed data signal in response to said processed data signal; wherein:

said test transmitter further comprises:
optical test signal transmitting means for transmitting an optical test signal carrying said test digital data signal after said radio test signal is transmitted;

said radio communication apparatus further comprising:
optical processing means for processing said optical test signal into said test digital data signal; and
selecting means connected to said radio and said optical processing means and to said data processing means for selecting, as a selected signal, the test digital data signal produced by said radio processing means while said test transmitter transmits said radio test signal and for selecting, as said selected signal, the test digital data signal produced by said optical processing means while said test transmitter transmits said optical test signal, said selecting means producing said selected signal as said input digital data signal;

said announcing means carrying out said announcing operation, while said test transmitter transmits said radio test signal, when said radio communication apparatus does not contain a faulty component, said announcing means carrying out no announcing operation, while said radio transmitter transmits said radio test signal, when said radio communication apparatus contains said faulty component, said announcing means carrying out said announcing operation, while said test transmitter transmits said optical test signal, when said faulty component is said radio processing means, said announcing means carrying out no announcing operation, while said test transmitter transmits said optical test signal, when said faulty component is a remaining part of said radio communication apparatus comprising said data processing means and said announcing means.

3. A radio communication apparatus for use in combination with a test transmitter which is for use in testing said radio communication apparatus by transmitting a radio test signal carrying a test digital data signal, said radio communication apparatus comprising: radio processing means for processing said radio test signal into said test digital data signal; data processing means connected to said radio processing means for processing said test digital data signal into a processed data signal; announcing means for carrying out an announcing operation of generation of said processed data signal in response to said processed data signal; a manually operable switch having on and off states and connected to a reference voltage source; and controlling means connected to said data processing and said announcing means and to said manually operable switch for controlling said announcing means to permit said announcing operation when said manually operable switch is put in said off state and for controlling said announcing means to inhibit said announcing operation when said manually operable switch is put in said on state; wherein said radio communication apparatus further comprises:

an electrically controllable switch having a control terminal and on and off states and connected to said manually operable switch in parallel, said electrically controllable switch being controllably put in said on state when said control terminal is supplied with a predetermined control voltage;

optical processing means supplied with an optical control signal carrying a digital control signal that is transmitted by said test transmitter, said optical processing means processing said optical control signal into said digital control signal; and control signal processing means connected to said optical processing means and to said control terminal for processing said digital control signal into said predetermined control voltage to supply said control terminal with said predetermined control voltage.

4. A radio communication apparatus for use in combination with a test transmitter which is for use in testing said radio communication apparatus by transmitting a radio test signal carrying a test digital data signal, said radio communication apparatus comprising: radio processing means for processing said radio test signal into said test digital data signal; data processing means connected to said radio processing means for processing said test digital data signal into a processed data signal; announcing means for carrying out an announcing operation of generation of said processed data signal in response to said processed data signal; a manually operable switch having on and off states and connected to a reference voltage source; controlling means and connected to said data processing and said announcing means and to said manually operable switch for controlling said announcing means to permit said announcing operation when said manually operable switch is put in said on state and for controlling said announcing means to inhibit said announcing operation when said manually operable switch is put in said off state; wherein said radio communication apparatus further comprises:

an electrically controllable switch having a control terminal and on and off states and connected to said manually operable switch in parallel, said electrically controllable switch being controllably put in said on state when said control terminal is supplied with a predetermined control voltage;

optical processing means supplied with an optical control signal carrying a digital control signal that is transmitted by said test transmitter, said optical processing means processing said optical control signal into said digital control signal; and control signal processing means connected to said optical processing means and to said control terminal for processing said digital control signal into said predetermined control voltage to supply said control terminal with said predetermined control voltage.

* * * * *